United States Patent Office 3,483,198
Patented Dec. 9, 1969

3,483,198
PYRIMIDOBENZOTHIAZINES
Irving M. Goldman, Niantic, Conn., assignor to Chas. Pfizer & Co., Inc., New York, N.Y., a corporation of Delaware
No Drawing. Continuation-in-part of application Ser. No. 592,765, Nov. 8, 1966. This application June 13, 1967, Ser. No. 645,594
Int. Cl. C07d 99/10; A61k 27/00
U.S. Cl. 260—243                                    30 Claims

ABSTRACT OF THE DISCLOSURE

4a - chloro - 1,3 - dimethyl - 1,2,3,4 - tetrahydro - 4a (H) - pyrimido - [5,4 - b][1,4] - benzothiazine - 2,4-dione (I, X=Cl) is prepared by refluxing 1,3-dimethyl-4-anilinouracil with thionyl chloride. Treating I (X=Cl) with alcohol, amine, phenol or thiol yields, respectively, I wherein X is alkoxy, amino, phenoxy or thio. Treating I (X=Cl) with wet acetone yields I (X=OH); treating 1 (X=Cl) with wet ether yields 1,3-dimethyl-1,2,3,4-tetrahydro - 10(H) - pyrimido[5,4 - b][1,4]benzothiazine-2,4,5-trione (IV); treating I (X=Cl) with wet acetone and sodium bicarbonate yields 1,3-dimethyl-4-hydroxy - 4 - (2 - benzothiazolyl) - imidazolidine - 2,5-dione (V). One-electron reduction of I (X=Cl) yields the stable 1,3 - dimethyl-2,4-diketo-1,2,3,4-tetrahydro-10 (H) - pyrimido[5,4 - b][1,4]benzothiazinyl free radical (II), and a two-electron reduction yields 1,3-dimethyl-1,2,3,4 - tetrahydro - 10(H) - pyrimido[5,4 - b][1,4] benzothiazine-2,4-dione (III). Hydrogen peroxide oxidation of III yields a mixture of IV and V. Pyrolysis of V yields 1,3-dimethylparabanic acid and benzothiazole. Alkylation of III with sodium hydride and methyl iodide yields a mixture of I (X=CH₃), stable 1,3,5-trimethyl-2,4 - diketo - 1,2,3,4 - tetrahydro - 5(H) - pyrimido[5,4-b][1,4]benzothiazinium ylid (VIII) and 1,3,10-trimethyl-1,2,3,4 - tetrahydro - 10(H) - pyrimido[5,4 - b][1,4] benzothiazine-2,4-dione. VIII undergoes pyrolytic and photolytic rearrangements to I (X=CH₃), which in turn undergoes photolytic rearrangement to 1,3-dimethyl-1,2,3,4,5,11 - hexahydropyrimido[5,4 - c][1,4]benzo(b) thiazepin-2,4-dione (IX). I (X=alkoxy, amino, methyl) and VIII are anti-inflammatory agents, and I (X=o-carboxyphenoxy, morpholino), III and IV inhibit phosphodiesterase enzyme activtiy.

CROSS-REFERENCE TO RELATED APPLICATIONS

This application is a continuation-in-part of Ser. No. 592,765, filed Nov. 8, 1966, now abandoned.

BACKGROUND OF THE INVENTION

This invention relates to a series of novel and useful chemical compounds; in particular, it is concerned with certain substituted pyrimido[5,4 - b][1,4]benzothiazines and related compounds, and methods for the preparation thereof.

Although compounds with the 1,3-diazaphenothiazine ring system are reported in the prior art, e.g. U.S. Patent No. 3,248,393, Apr. 26, 1966, the compounds of the instant invention and methods for the preparation thereof are novel. In addition, compounds of the instant invention exhibit unexpected pharmacological activity.

SUMMARY OF THE INVENTION

Among the compounds of interest in the present invention are those of the formula wherein $R_1$ and $R_2$ are each selected from the group consisting of normal alkyl containing up to 6 carbon atoms, phenyl, benzyl, and β-phenylethyl; X is selected from the group consisting of hydroxy, alkoxy, phenoxy, o-carboxyphenoxy, alkyl sulfide and aryl sulfide, substituted and unsubstituted amino, normal alkyl containing up to 5 carbon atoms, chloro and bromo; and $Y_1$ and $Y_2$ are each selected from the group consisting of hydrogen, halogen, alkoxy, alkyl sulfide, carboxy, carbomethoxy, carbethoxy, carboxymethyl, carbomethoxymethyl, carbethoxymethyl ether, chloroformyl, acetyl, dimethylcarboxamido, dimethylsulfonamido, nitrile, nitro, trifluoromethyl, and, with $Y_1$ and $Y_2$ on adjacent carbon atoms, methylenedioxy and ethylenedioxy; provided that when X is chloro or bromo, neither $Y_1$ or $Y_2$ are carboxy or carboxymethyl ether.

The numbering system indicated herein is that established by "Chemical Abstracts."

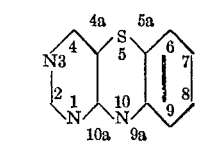

The 4a-chloro compounds provide a means of generating many series of new and useful compounds, the reactions involved also being novel. Charts I–II provide a schematic of the novel compounds and related chemistry of interest in the instant invention. Of course, the scope of the chemical reactions disclosed herein is not restricted by the specifications of $R_1$, $R_2$, $Y_1$ and $Y_2$; it is understood that the only limitations on the nitrogen and aromatic substituents, with regard to the chemical conversions, are those imposed by synthetic difficulties and interactions between substituents and the various reagents employed.

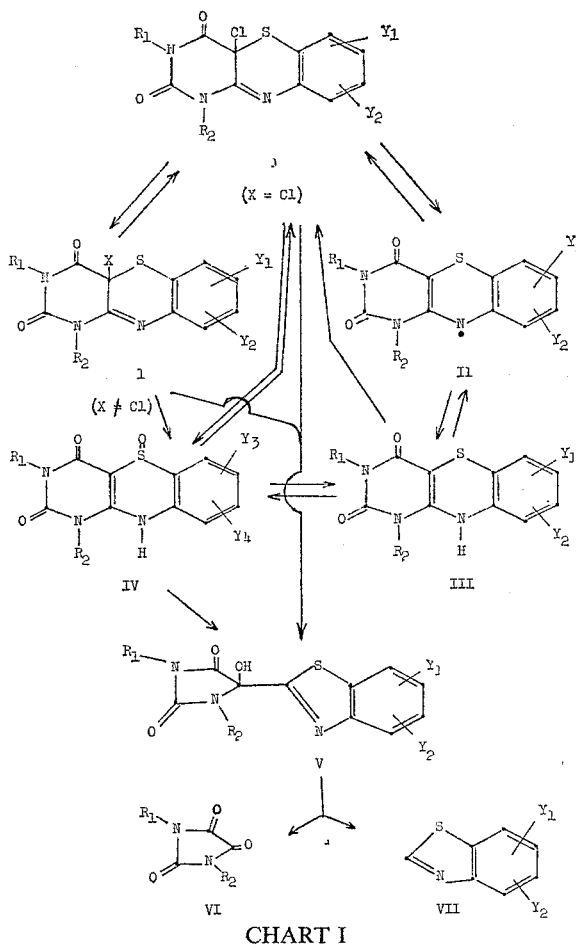

CHART I

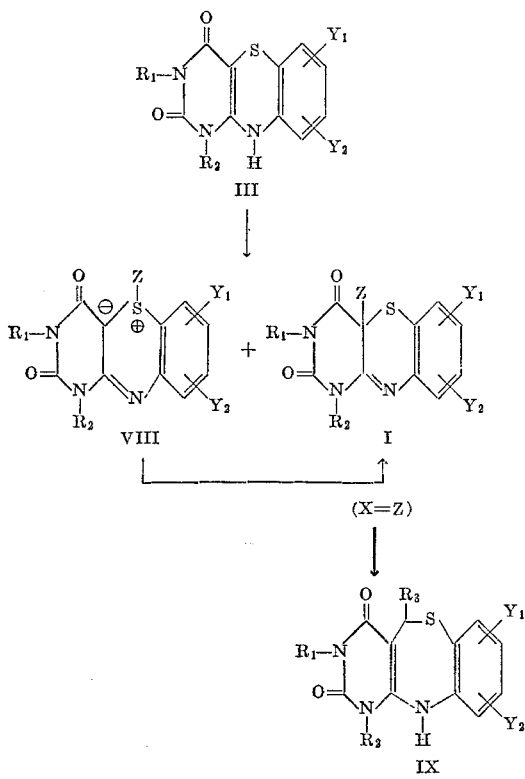

CHART II

The compounds of the instant invention are useful as synthetic intermediates and as chemotherapeutic agents, such anti-inflammatory agents and inhibitors of phosphodiesterase enzyme activity.

DETAILED DESCRIPTION OF THE INVENTION

The 4a-chloro- and 4a-bromo-1,3-disubstituted-1,2,3,4-tetrahydro - 4a(H) - pyrimido[5,4 - b][1,4]benzothiazine-2,4-iones of the instant invention are novel compounds from which a great variety of related compounds can be synthesized. In a preferred embodiment of this invention, $R_1$ and $R_2$ are as aforesaid, X is chloro, and $Y_1$ and $Y_2$ are as aforesaid, and more preferably, $R_1$ and $R_2$ are methyl, X is chloro, $Y_1$ is hydrogen and $Y_2$ is 7-chloro.

The 4a-chloro and bromo derivatives of Compounds I are synthesized from 4-anilinouracils of the formula

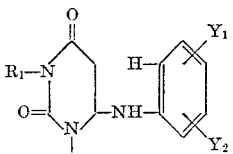

wherein $R_1$, $R_2$, $Y_1$ and $Y_2$ are as specified for Compounds I, by refluxing with about 20 parts by volume of thionyl chloride or thionyl bromide. Thionyl chloride is the preferred reagent; however, it is understood that references hereinafter to thionyl chloride and the 4a-choro compounds also apply to thionyl bromide and the 4a-bromo compounds. In carrying out the reaction, generally familiar precautions necessitated by the nature of these reagents must be exercised, such as anhydrous and oxygen-free conditions. Less thionyl chloride can be used by conducting the reaction in an inert solvent; two equivalents of thionyl chloride have been found to be adequate by using chloroform as a solvent. Reaction time is not critical, with ½–4 hours being adequate, and, although reflux temperature is preferred, lower temperatures can be used with correspondingly longer reaction times.

Isolation of the 4a-chloro intermediates is accomplished by means generally familiar to those skilled in the art, such as removal of solvent and recrystallization. The 4a-chloro and 4a-bromo derivatives of Compounds I are stable in an inert solvent in the absence of water and oxygen.

When a 4'-unsubstituted anilinouracial derivative is used as a substrate in the above synthesis, the resulting Compound I is unsubstituted in the 7-position. However, when a volume of pyridine is added, about 10–20% of the volume of thionyl chloride, the resulting Compound I is chlorinated in the 7-position.

The anilinouracils, some of which are previously unknown, can be synthesized by the methods taught in the prior art, e.g., Goldner et al., Ann., 694, 142 (1966), whereby a 1,3-disubstituted 4-chlorouracil is condensed with an aniline. Also 4-aminouracils can be similarly condensed to yield the same products. It is to be noted that 4a-chloro derivatives of Compounds I cannot accommodate carboxy or carboxy-containing substituents on the aromatic ring. If an anilinouracil, wherein $Y_1$ or $Y_2$ is carboxy or carboxymethyl ether, if subjected to the reaction conditions, the aromatic substituent will be converted to a chloroformyl group.

In addition to the hereinbefore specified substituents, equivalent results will be obtained with $R_1$ and $R_2$ being selected from secondary alkyl and normal and secondary alkenyl containing up to 6 carbon atoms, and $Y_1$ and $Y_2$ being selected from alkyl containing up to 4 carbon atoms, carboxymethyl, carbomethoxymethyl, carbethoxymethyl, carboxylate containing up to 4 carbon atoms, acyl containing up to 4 carbon atoms, carbamate containing up to 4 carbon atoms, and tertiary amino.

Additional methods of preparing 4a-chloro derivatives of Compound I, principally by treating various other derivatives of the system with thionyl chloride, are disclosed hereinafter.

Compounds I, wherein X is selected from the group consisting of hydroxy, alkoxy, phenoxy, o-carboxyphenoxy, alkyl sulfide and aryl sulfide, and substituted and unsubstituted amino, are prepared from Compounds I wherein X is chloro or bromo by reacting with the appropriate alcohol, phenol, alkyl, thiol, thiophenol, amine, ammonia, or water. Illustrative of preferred reagents which may be used are methanol, ethanol, propanol, isopropanol, phenol, salicyclic acid, thiols containing up to 4 carbon atoms, monosubstituted amines with primary or secondary alkyl group of up to 6 carbon atoms, benzyl amine, β-phenylethylamine, disubstituted amines with primary or secondary alkyl groups of up to 4 carbon atoms, methyl-β-hydroxyethylamine, N,N',N'-trimethyl-1,2-ethylenediamine, 4-methylpiperazine, 4-(β-hydroxyethyl)piperazine, 4-hydroxypiperidine, morpholine, pyrrolidine, ammonia, and water. In a preferred embodiment of Compounds I, wherein X is not chloro, bromo or alkyl, $R_1$ and $R_2$ are methyl, X is alkoxy or substituted and unsubstituted amino, and $Y_1$ and $Y_2$ are as aforesaid. Specific embodiments which are preferred are those wherein $R_1$ and $R_2$ are methyl, X is ethoxy, $Y_2$ is hydrogen and $Y_2$ is 7-chloro; $R_1$ and $R_2$ are methyl, X is ethoxy, $Y_1$ is hydrogen and $Y_2$ is 7-carbethoxy; $R_1$ and $R_2$ are methyl, X is methyl-(β-hydroxyethyl)amino, $Y_1$ is hydrogen and $Y_2$ is 7-chloro; $R_1$ and $R_2$ are methyl, X is 4-hydroxypiperidino, $Y_1$ is hydrogen and $Y_2$ is 7-chloro; $R_1$ and $R_2$ are methyl, X is morpholino, $Y_1$ is hydrogen and $Y_2$ is 7-chloro; $R_1$ and $R_2$ are methyl, X is o-carboxyphenoxy, $Y_1$ is hydrogen and $Y_2$ is 7-chloro; and $R_1$ and $R_2$ are methyl, X is 4-methylpiperazino, $Y_1$ is hydrogen, and $Y_2$ is 7-chloro. It is to be noted that the scope of acceptable amines does not include hydrazine or hydrazine derivatives for reasons to be disclosed hereinafter.

In the preparation of Compounds I, wherein X is not chloro, bromo or alkyl, crude 4a-chloro derivatives, as obtained from the reaction of the corresponding anilinouracil with thionyl chloride, may be used without purification. The reaction is carried out with an excess of the reagent, H-X, preferably with at least a 2-molar equivalent amount, and, if the reagent is a liquid, either with or without a solvent. Preferred inert solvents are methylene chloride, chloroform, benzene, hexane, and the like. Reaction temperature is not critical, being restricted only by the reflux and freezing temperatures of the solvent and reagent; best results are obtained between room and reflux temperatures, as lower temperatures require longer reaction times. Certain gaseous reagents, such as dimethylamine, may be conveniently condensed into a solvent to facilitate their addition, while others, such as ammonia, are more conveniently added by bubbling the gas through the reaction mixture. Also, it often is advantageous to add a reagent which will remove the hydrogen chloride which is co-produced in the reactions, sodium carbonate and sodium bicarbonate being acceptable. In cases where isolation of the product would be facilitated by the use of a smaller excess of reagent, a 10-20% excess is adequate if the acid acceptor is added. Isolation of the compounds is effected by means generally familiar to those skilled in the art, such as precipitation or removal of solvent in vacuo and purification by chromatography or recrystallization.

When the 4a-chloro compound contains a cholroformyl substituent on the aromatic ring, conversion to hereinbefore described Compounds I, wherein X is not chloro, bromo or alkyl, will result in replacement of both chlorine atoms, e.g., 4a-chloro-7-chloroformyl compound will be converted to the corresponding 4a-ethoxy-7-carbethoxy compound by treatment with ethanol. Similar conversions, to a certain extent, can be expected with $Y_1$ and $Y_2$ being an ester group or the like. After isolation of the product, aromatic substituents may be transformed as desired by means generally familiar to those skilled in the art.

The 4a-hydroxy derivatives are prepared from the 4a-chlorides by adding the latter to a water-acetone mixture, from which the desired product is then recovered. The proportion of water to acetone in the mixture is not critical, although best results are obtained when neither constitutes less than about 10% of the mixture. Stirring and heating of the reaction mixture are often beneficial, but are not necessary. It is important that no sodium bicarbonate or other acid acceptor be added to the reaction mixture. Also, water-methylene chloride and water-chloroform mixtures may be used, in which case the absence of the sodium bicarbonate is not critical.

Compounds I, wherein X is not chloro, bromo or alkyl, are reconverted to the corresponding 4a-chloro compounds by treatment with thionyl chloride. Also, 4a-amino derivatives are transformed to 4a-alkoxy and 4a-sulfide compounds by treatment with alcohol or thiol, respectively, in the presence of acid.

Compounds I, other than when X is alkyl, are useful chemical intermediates, as will be discussed hereinafter. Also, members of this series exhibit useful pharmacological activity. Some, such as the 1,3-dimethyl-7-chloro compounds wherein X is methyl-(β-hydroxyethyl)amino, 4-hydroxypiperidino, 4 - methylpiperazino, morpholino, methoxy, and ethoxy and the 1,3-dimethyl-4a-ethoxy-7-carbethoxy derivative are particularly effective as antiinflammatory agents. Others, such as the 1,3-dimethyl-7-chloro derivatives wherein X is o-carboxyphenoxy, morpholino and 4-methylpiperazino inhibit phosphodiesterase enzyme activity. Compounds I wherein X is alkyl are discussed hereinafter.

A one-electron reduction of the 4a-chloro compounds results unexpectedly in the formation of Compounds II, stable free radicals of the formula

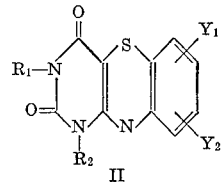

II wherein $R_1$ and $R_2$ are each selected from the group consisting of normal alkyl containing up to 6 carbon atoms, phenyl, benzyl and β-phenylethyl; and $Y_1$ and $Y_2$ are each selected from the group consisting of hydrogen, halogen, alkoxy, alkyl sulfide, carboxy, carbomethoxy, carbethoxy, carboxymethyl, carbomethoxymethyl, carbethoxymethyl, chloroformyl, acetyl, dimethylcarboxamido, dimethylsulfonamido, nitrile, nitro, trifluoromethyl, and with $Y_1$ and $Y_2$ on adjacent carbon atoms, methylenedioxy and ethylenedioxy. In a preferred embodiment of this invention, $R_1$ and $R_2$ are methyl, and $Y_1$ and $Y_2$ are each selected from the group consisting of hydrogen, halogen, alkoxy, alkyl sulfide, carboxy, carbomethoxy, carbethoxy, carboxymethyl, carbomethoxymethyl, carbethoxymethyl, chloroformyl, acetyl, dimethylcarboxamido, dimethylsulfonamido, nitrile, nitro, trifluoromethyl, and, with $Y_1$ and $Y_2$ on adjacent carbon atoms, methylenedioxy and ethylenedioxy. More preferably, $R_1$ and $R_2$ are methyl, $Y_1$ is hydrogen, and $Y_2$ is 7-chloro; $R_1$ and $R_2$ are methyl, $Y_1$ is hydrogen and $Y_2$ is 7-carboxy; and $R_1$ and $R_2$ are methyl, $Y_1$ is hydrogen, and $Y_2$ is 7-chloroformyl.

In addition to the hereinbefore specified substituents, equivalent results will be obtained with $R_1$ and $R_2$ being selected from secondary alkyl and normal and secondary alkenyl containing up to 4 carbon atoms, and $Y_1$ and $Y_2$ being selected from carboxymethyl, carbomethoxymethyl, carbethoxymethyl, carboxylate containing up to 4 carbon atoms, acyl containing up to 4 carbon atoms, carbamate containing up to 4 carbon atoms, and tertiary amino.

The conversion to the radical is a one-electron reduction, effected by a molar equivalent amount of reducing agent. If more than a molar equivalent amount is used, the radical will often undergo further reduction. Among the reducing agents which are acceptable are hydrazine and derivatives thereof, such as phenylhydrazine, methylhydrazine, 1,1-dimethylhydrazine, 1,2-dimethylhydrazine, N-aminopyrrolidine, N-aminopiperidine, N-aminohexamethyleneimine, and N-aminomorpholine, zinc metal, reducing cations such as ferrous, manganous and stannous, and sulfite and thiosulfate anions. As noted hereinbefore, Compounds I cannot have a 4a-hydrazino substituent because the reagent will reduce the 4a-chloro substrate.

It is preferable to reduce 4a-chloro compounds which contain a chloroformyl group with ferrous, thiosulfate or sulfite, which will yield the radical with a carboxyl group; the use of hydrazines may result in the formation of hydrazides. Also, the use of a zinc powder suspension will leave the chloroformyl group intact in the radical allowing one skilled in the art to produce a great variety of other substituents from this active group.

The reaction is conducted in an inert solvent, such as methylene chloride, chloroform, hexane, benzene and dioxane. Reaction temperature is not critical, being limited only by the freezing and boiling points of the solvent and the reagents used. However, best results are obtained from about room temperature to about reflux temperature. The time required for the reduction may vary from a few seconds to several minutes, depending upon the reducing agent used and the reaction temperature. Recovery and purification of the product are accomplished by methods generally familiar to those skilled in the art, such as precipitation and filtration, solvent removal, column chromatography, extraction, and recrystallization.

The stable free radicals, Compounds III, are soluble in a number of solvents, including methylene chloride, chloroform, benzene, and warm hexane. They are stable for long periods in the crystalline form and also in solution in the absence of oxygen. The compounds do not show a nuclear magnetic resonance spectrum, which is characteristic of radicals, and their electron spin resonance spectra are consistent with the proposed structure. As would be expected, addition of chlorine gas to a solution of the radical produces immediate bleaching and results in the reformation of the corresponding 4a-chloro derivative of Compound I.

The stable free radicals are useful as synthetic intermediates, as described hereinafter. In addition, they are useful in their own right as examples of an unusual class of chemical compounds. Because of their properties, Compounds II are model systems for the investigation of particle motion in liquids, semiconductors, indicators for the presence of other free radicals by the disappearance of their characteristic color, tools for the determination of chemical bond strengths and the study of chemical reaction mechanisms. Also, because of their ability to scavenge radical, Compounds II are useful as preservatives of rubber products and as a means of obtaining low molecular weight polymers. It is also noted that Compounds II are unique among stable free radicals in that they are also pharmacophoric structures which will penetrate cell membranes and interact with cellular constituents.

Also obtained by reduction of the 4a-chloro derivatives are Compounds III, of the formula

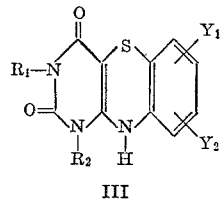

III wherein $R_1$ and $R_2$ are each selected from the group consisting of normal alkyl containing up to 6 carbon atoms, phenyl, benzyl, and β-phenethyl; and $Y_1$ and $Y_2$ are each selected from the group consisting of hydrogen, halogen, alkoxy, alkyl sulfide, carboxy, carbomethoxy, carbethoxy, carboxymethyl, carbomethoxymethyl, carbethoxymethyl, chloroformyl, acetyl, dimethylcarboxamido, dimethylsulfonamido, nitrile, nitro, trifluoromethyl, and, with $Y_1$ and $Y_2$ on adjacent carbon atoms, methylenedioxy and ethylenedioxy. Preferably, $R_1$ and $R_2$ are methyl, and $Y_1$ and $Y_2$ are each selected from the group consisting of hydrogen, halogen, alkoxy, alkyl sulfide, carboxy, carbomethoxy, carbethoxy, carboxymethyl, carbomethoxymethyl, carbethoxymethyl, chloroform, acetyl, dimethylcarboxamido, dimethylsulfonamido, nitrile, nitro, trifluoromethyl, and, with $Y_1$ and $Y_2$ on adjacent carbon atoms, methylenedioxy and ethylenedioxy. More preferably, $R_1$ and $R_2$ are methyl, $Y_1$ is hydrogen, and $Y_2$ is 7-chloro; and $R_1$ and $R_2$ are methyl, $Y_1$ is hydrogen, and $Y_2$ is 7-carboxy. Equivalent results are obtained with those substituents specified hereinbefore for Compounds II.

The formation of Compounds III from the 4a-chloro derivatives is a two-electron reduction, comparable to the one-electron reduction resulting in the stable free radicals. For this reason, an amount of reducing agent in excess of a molar equivalent amount is required, and preferably at least a two molar equivalent amount is used. The stable free radicals can be further reduced, as indicated hereinbefore, to Compounds III. Among the reducing agents which are acceptable are all those specified hereinbefore with regard to Comopunds II. The restriction of using hydrazines applies when the substrate contains a chloroformyl or related substituent. However, the preferred method of reduction to yield Compounds III wherein $Y_1$ or $Y_2$ is to contain a carboxyl group is to use a concentrated solution of hydrochloric, hydrobromic, or hydriodic acid with a 4a-chloro compound with corresponding $Y_1$ or $Y_2$ containing the chloroformyl group.

The reaction is conducted under the same conditions employed in the synthesis of Compounds II, i.e., common organic solvents such as methylene chloride, chloroform, dioxane, ether, and benzene may be used, reaction temperature is limited only by characteristics of the solvent although best results are obtained by heating the reaction mixture, and the time required may vary from a few seconds to several minutes depending upon the reagent and temperature. The product is formed as a precipitate, which may be collected by filtration and recrystallized from DMF/water, alkali/acid, or the like.

Alternate methods of synthesizing Compounds III are refluxing the 4a-alkoxy derivatives, Compounds I in 50% ethanolic solution of concentrated hydrochloric acid, and treatment of the 4-amino derivatives with zinc amalgam/acetic acid.

Compounds III are reconverted to the 4a-chloro derivatives by treatment with thionyl chloride, and can be easily oxidized to the stable free radicals, Compounds II. This oxidation step makes Compounds III useful as inhibitors of radical processes, since a non-stable free radical will abstract a hydrogen atom from Compounds III. These compounds are useful as synthetic intermediates, as hereinafter discussed, and they are pharmacologically active, with members of the series inhibiting phosphodiesterase activity.

A variety of methods have been found for the synthesis of Compounds IV, sulfoxides of the formula

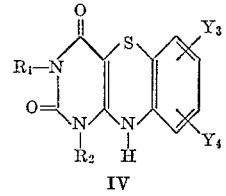

IV wherein $R_1$ and $R_2$ are each selected from the group consisting of normal alkyl containing up to 6 carbon atoms, phenyl, benzyl, and β-phenylethyl; and $Y_3$ and $Y_4$ are each selected from the group consisting of hydrogen, halogen, alkoxy, alkyl sulfide, carboxy, carbomethoxy, carbethoxy, carboxymethyl, carbomethoxymethyl, carbethoxymethyl, acetyl, dimethylcarboxamido, dimethylsulfonamido, nitrile, nitro, trifluoromethyl, and, with $Y_3$ and $Y_4$ on adjacent carbon atoms, methylenedioxy and ethylendioxy. Preferably, $R_1$ and $R_2$ are methyl, and $Y_3$ and $Y_4$ are each selected from the group consisting of hydrogen, halogen, alkoxy, alkyl sulfide, carboxy, carbomethoxy, carbethoxy, carboxymethyl, carbomethoxymethyl, carbethoxymethyl acetyl, dimethylcarboxamido, dimethylsulfonamido, nitrile, nitro, trifluoromethyl, and, with $Y_3$ and $Y_4$ on adjacent carbon atoms, methylenedioxy and ethylenedioxy. More preferably, $R_1$ and $R_2$ are methyl, $Y_3$ is hydrogen, and $Y_4$ is 7-chloro; and $R_1$ and $R_2$ are methyl, $Y_3$ is hydrogen, and $Y_4$ is 7-carboxy.

Treating the 4a-chloro intermediate with a water-ether mixture results in an almost quantitative yield of the sulfoxide; however, as specified hereinbefore, using wet acetone in place of wet ether results in the formation of the 4a-hydroxy derivative of Compound I. In converting the 4a-chloro compound to the sulfoxide, the proportions of the water and ether are not critical; it is only necessary that there be sufficient ether to dissolve the substrate and sufficient water to take up the acid which is generated. It is preferable that there be a large excess of both solvents, and that the reaction mixture is shaken vigorously until the desired product precipitates. Treatment of the 4a-amino derivatives with wet ether will similarly yield the sulfoxides, although it is necessary to have a quantity of hydrochloric acid in the reaction mixture to neutralize the basic amine which is generated. There is facile interconversion between the sulfoxide and the 4a-hydroxy derivative, as evidenced by treating either the 4a-chloro or 4a-amino derivatives with glacial acetic acid. An equilibrium is thereby rapidly established between the two compounds, with a 50% conversion to each.

Compounds IV are also produced by the oxidation of Compounds III. Addition of hydrogen peroxide (30% solution) to a heated, preferably refluxing, suspension of Compounds III will effect this oxidation. An excess of peroxide should be used. The addition of the peroxide should be done with care. If sufficient base is added to dissolve the sulfide, the reaction will be complete within about an hour; without the base, the reaction will not proceed as rapidly. The preferred solvent system is ethanol/ethoxide, although methanol-methoxide, water/hydroxide, and the like are also acceptable. Other peroxides and peroxy acids may be used as well as the preferred oxidizing agent, hydrogen peroxide. Preparation of the sulfoxides is not done by this method when the Compound III contains a sulfide group as either $Y_3$ or $Y_4$. Also, when $Y_3$ or $Y_4$ is carboxy or carboxylate, there will be interaction between the group and the solvent used.

Members of this series exhibit useful biological activity, in particular as inhibitors of phosphodiesterase activity, and, they are useful synthetic intermediates, as hereinafter discussed. Treatment of Compounds IV with a concentrated ethanolic solution of hydrogen chloride, hydrogen bromide, or other such reducing agent results in the formation of Compounds III. Also, treatment with thionyl chloride will convert the sulfoxide back to the 4a-chloro intermediate.

Compounds I and IV can be converted into substituted benzothiazoles of the formula

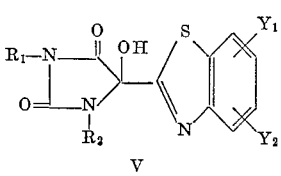

V wherein $R_1$ and $R_2$ are each selected from the group consisting of normal alkyl containing up to 6 carbon atoms, phenyl, benzyl, and β-phenylethyl; and $Y_1$ and $Y_2$ are each selected from the group consisting of hydrogen, halogen, alkoxy, alkyl sulfide, carboxy, carbomethoxy, carbethoxy, carboxymethyl, carbomethoxymethyl, carbethoxymethyl, chloroformyl, acetyl, dimethylcarboxamido, dimethylsulfonamido, nitrile, nitro, trifluoromethyl, and, with $Y_1$ and $Y_2$ on adjacent carbon atoms, methylenedioxy and ethylenedioxy. Preferably $R_1$ and $R_2$ are methyl, and $Y_1$ and $Y_2$ are each selected from the group consisting of hydrogen, halogen, alkoxy, alkyl sulfide, carboxy, carbomethoxy, carbethoxy, carboxymethyl, carbomethoxymethyl, carbethoxymethyl ether, chloroformyl, acetyl, dimethylcarboxamido, dimethylsulfonamido, nitrile, nitro, trifluoromethyl, and, with $Y_1$ and $Y_2$ on adjacent carbon atoms, methylenedioxy and ethylenedioxy. However, equivalent results will be obtained with those substituents specified hereinbefore with regard to Compounds II. Treating a 4a-chloro derivative of Compound I with an acetone-water mixture containing sodium bicarbonate, or a similar acid acceptor, results directly in the formation of the corresponding Compound V. Although the proportions of the acetone-water mixture are not critical it is preferable to have neither constitute less than about 10% of the mixture, and that there be a large excess of the solvent mixture. Vigorous shaking will facilitate the reaction. Also, best results are obtained when the amount of sodium bicarbonate is in excess of a molar equivalent amount, and when the reaction is conducted at an elevated temperature, as over a steam bath. Under these conditions, five minutes has been found to be a sufficient reaction time. In the absence of the sodium bicarbonate, as hereinbefore discussed, the product obtained is the 4a-hydroxy derivative of Compound I. Upon heating this compound above its melting point, an unexpected rearrangement occurs by which the 4a-hydroxy compound is converted into the substituted benzothiazole, Compound V, and also, if the temperature be high enough, into the hereinafter described pyrolysis products of said benzothiazoles.

Treating Compounds I, wherein X is not alkyl, with glacial acetic acid provides another means of synthesizing Compounds V. As noted hereinbefore, such treatment quickly forms the sulfonium ion of the formula

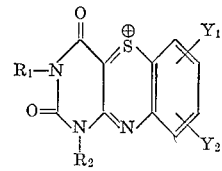

Upon quenching with water, approximately equal amounts of the 4a-hydroxy and sulfoxide compounds are formed. However, reaction times in excess of about one hour result in the formation of the benzothiazole with a corresponding decrease in the yields of the 4a-hydroxy and sulfoxide compounds. Thus, treatment of sulfoxides with warm glacial acetic acid will also result in formation of the benzothiazole. Other simple organic acids will effect the same transformation, with neither reaction time nor temperature being critical. It is preferable to exclude water from the system, although small amounts can be tolerated. Also, Compound V is co-produced with the sulfoxide when Compound III is reacted with hydrogen peroxide in the hereinbefore described manner; presumably, formation of the benzothiazole proceeds through the sulfoxide. Separation of the two products can be accomplished by means generally familiar to those skilled in the art, e.g., trituration with chloroform will remove the benzothiazole from the more insoluble sulfoxide.

Compounds V, and, therefore, Compounds I–IV from which these 2-substituted benzothiazoles are produced, are useful synthetic intermediates. Heating Compounds V to about 25–50° C. above their melting points, which requires a temperature of about 150–300° C. depending upon $R_1$, $R_2$, $Y_1$ and $Y_2$, results in the formation of disubstituted parabanic acids (Compounds VI) and 2-unsubstituted benzothiazoles (Compounds VII). This pyrolysis, which may be conducted in an inert solvent such as a suitably high-boiling petroleum fraction, ether, or glycerol ether, is a convenient and novel way to produce benzothiazoles with numerous and diverse substituents on the benzene moiety. This process will greatly increase the availability of useful benzothiazole derivatives, which are a commercially important class of compounds. Among the major applications of these compounds is their use in the production of benzothiazole-based cyanine dyes, which are of great interest due to their unique properties as photographic sensitizers.

Alkylation of Compounds III, resulting in the formation of useful materials, is accomplished by means of reacting the sodium salt of III with alkyl iodides. One reaction product, which forms a precipitate, is a sulfonium ylid of the formula

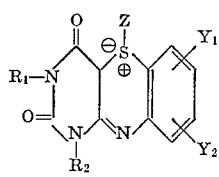

VIII wherein $R_1$ and $R_2$ are each selected from the group consisting of normal alkyl containing up to 6 carbon atoms, phenyl, benzyl, and β-phenylethyl; $Y_1$ and $Y_2$ are each selected from the group consisting of hydrogen, halogen, alkoxy, alkyl sulfide, carboxy, carbomethoxy, carbethoxy, carboxymethyl, carbomethoxymethyl, carbethoxymethyl; chloroformyl, acetyl, dimethylcarboxamido, dimethylsulfonamido, nitrile, nitro, trifluoromethyl, and, with $Y_1$ and $Y_2$ on adjacent carbon atoms, methylenedioxy and ethylenedioxy; and Z is normal alkyl containing up to 5 carbon atoms. Preferably, $R_1$ and $R_2$ are methyl; $Y_1$ and $Y_2$ are each selected from the group consisting of hydrogen, halogen, alkoxy, alkyl sulfide, carboxy, carbomethoxy, carbethoxy, carboxymethyl, carbomethoxymethyl, carbethoxymethyl, chloroformyl, acetyl, dimethylcarboxamido, dimethylsulfonamido, nitrile, nitro, trifluoromethyl, and, with $Y_1$ and $Y_2$ ion adjacent carbon atoms, methylenedioxy and ethylenedioxy; and Z is methyl; and more preferably, $R_1$ and $R_2$ are methyl, $Y_1$ is hydrogen, $Y_2$ is 7-chloro and Z is methyl. However, equivalent results will be obtained with those substituents specified hereinbefore with regard to Compounds II. Members of this series are useful as anti-inflammatory agents. Also, they are of interest because their great stability as compared with previously reported sulfonium ylids.

A second product of the alkylation is Compound I, wherein $R_1$, $R_2$, $Y_1$ and $Y_2$ are as specified for sulfonium ylids and X is normal alkyl containing up to 5 carbon atoms. Preferably $R_1$ and $R_2$ are methyl, X is methyl, and $Y_1$ and $Y_2$ are each selected from the group consisting of hydrogen, halogen, alkoxy, alkyl sulfide, carboxy, carbomethoxy, carbethoxy, carboxymethyl, carbomethoxymethyl, carbethoxymethyl, chloroformyl, acetyl, dimethylcarboxamido, dimethylsulfonamido, nitrile, nitro, trifluoromethyl, and, with $Y_1$ and $Y_2$ on adjacent carbon atoms, methylenedioxy and ethylenedioxy; and more preferably, $R_1$ and $R_2$ are methyl, X is methyl, $Y_1$ is hydrogen and $Y_2$ is 7-chloro. However, equivalent results will be obtained with those substituents specified hereinbefore with regard to Compounds II. Members of this series are useful as anti-inflammatory agents.

The alkylating reaction is performed under anhydrous conditions in an inert solvent such as dimethyl sulfoxide, dimethylacetamide, or dimethylformamide, preferably the latter. Sodium hydride, preferably in mineral oil, is added slowly and with stirring to the substrate, forming the sodium salt of Compound III. The alkylating agent is then added and the reaction mixture is stirred overnight for about 16 hours. The reaction temperature is not critical, with good results obtained at about room temperature. After about two hours, Compound VIII begins to precipitate, and when the reaction is completed, it is isolated by filtration and recrystallized from suitable solvents, such as ethanol/chloroform. The 4a-alkyl derivative of Compound I is isolated from the filtrate by conventional methods, such as concentrating the filtrate to an oil which is then passed through a column of Alumina Activity III with benzene. In addition to normal alkyl iodides containing up to 5 carbons, other alkylating agents may be used to yield corresponding products, such iso-alkyl iodides containing up to 6 carbon atoms, normal alkyl bromides, benzyl chloride, benzyl bromide, benzyl iodide, β-phenylethyl iodide, and ethyl iodoacetate. Also, dimethyl sulfate may be as an alkylating agent. An additional product of the reaction is the N-alkylated compound of the formula

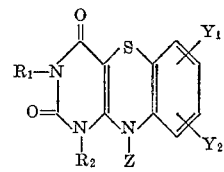

Alternatively, the 4a-alkyl derivatives of Compound I can be prepared by pyrolytic or photolytic rearrangement of Compounds VIII. Heating the sulfonium ylids to a temperature above their melting points at a pressure of 1 mm. Hg or less, or irradiating the ylids with ultraviolet light, will effect the rearrangement. The pyroytic rearrangement is best carried out in a simple sublimation apparatus and the rearranged product is conveniently distilled out from a less volatile residue. A reaction time of from about one to about ten minutes is sufficient.

The 4a-chloro derivative of Compound I undergoes an unexpected photolytic rearrangement to thiazepine derivatives of the formula

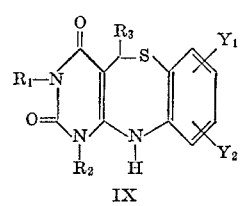

IX

The rearrangement involves the abstraction of an α-hydrogen of the alkyl group. Thus, $R_3$ is determined by the 4a-alkyl substituent; 4a-methyl will give rise to $R_3$ being hydrogen, 4a-ethyl to $R_3$ being methyl, etc. It is to be noted that the thiazepin may be alkylated at the unsubstituted nitrogen, to give additional derivatives.

In addition, it has been found that benzothiazoles V, when refluxed with thionyl chloride for about 10–20 minutes, are converted to the corresponding chloro compounds

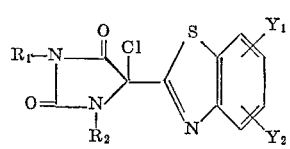

wherein $R_1$, $R_2$, $Y_1$ and $Y_2$ are as specified for Compounds V. Removal of the thionyl chloride in vacuo permits isolation of the material. Substitution of the chlorine atom of this compound to alkoxy, amino or sulfide can be accomplished by addition of an appropriate alcohol, phenol, amine or thiol to a methylene chloride or chloroform solution of the chloro derivative. The scope of the alkoxy, amino and sulfide derivatives is the same as specified hereinbefore with regard to the 4a-alkoxy, amino, and sulfide derivatives of Compound I.

Members of several series of compounds of the instant invention possess substantial anti-inflammatory activity, as judged by standard test procedures. These compounds are of value in alleviating swelling and inflammation which are symptomatic of rheumatism and arthritis and of other disorders which are responsive to treatment with anti-inflammatory agents. Either as individual therapeutic agents or as mixtures of therapeutic agents, they may be administered alone, but are generally administered with a pharmaceutical carrier selected on the basis of the chosen route of administration and standard pharmaceutical practice. For example, they may be administered orally in the form of tablets or capsules containing such excipients as starch, milk sugar or certain types of clay, etc. They may be administered orally in the form of elixirs or oral suspensions with the active ingredients combined with emulsifying and/or suspending agents. Diluents such as ethanol, propylene glycol, glycerine and various combinations of diluents may be employed. They may be injected parenterally, and for this use they may be prepared in the form of sterile aqueous solutions containing other solvents such as saline or glucose. Such aqueous solutions should be suitably buffered, if necessary, to render them isotonic.

The dosage required to reduce inflammation or swelling would be determined by the nature and extent of the symptoms as well as by the potency and pharmacodynamic characteristics of the particular agent. Generally, small doses will be administered initially, with a gradual increase in the dosage until the optimum level is determined. It will be generally found that when the composition is administered orally, larger quantities of the active ingredient will be required to produce the same level as produced by a small quantity administered parenterally. In general, from about 0.02 to about 200 mg. of active ingredient per kilogram of body weight, administered in single or multiple dose units, will effectively reduce inflammation and swelling.

Also, members of several series of compounds of the instant invention inhibit the activity of the enzyme phosphodiesterase, which catalyzes the conversion of adenosine-3′,5′-monophosphate (3′,5′-AMP) to adenosine-5′-monophosphate (5′-AMP). The ability of compounds of the instant invention to inhibit phosphodiesterase activity provides a new and convenient means of maintaining the level of the nucleotide 3′,5′-AMP, which is an important regulator of numerous cellular and tissue processes, e.g. smooth muscle relaxation, lipolysis and glycogenolysis.

Among other agents which inhibit phosphodiesterase activity are caffeine, theophylline, papaverine, diazoxide and other smooth muscle relaxants, bronchodilators and anti-hypertensive agents. Inasmuch as these chemotherapeutic agents act on the level of 3′,5′-AMP, it is believed that the compounds of this invention which share this activity will exhibit related pharmacological properties. At $10^{-4}$ molar concentration with papaverine as reference at unit activity, the following relative activities were observed.

| Compounds: | Relative inhibition of P′ d′ ase activity |
|---|---|
| Papaverine | 1 |
| (I) $R_1=R_2=CH_3$; X=o - carboxyphenoxy; $Y_1=H$, $Y_2=7$-Cl | 3.8 |
| (III) $R_1=R_2=CH_3$; $Y_1=H$, $Y_2=7$-Cl | 1.8 |
| (IV) $R_1=R_2=CH_3$; $Y_3=H$, $Y_4=7$-Cl | 0.3 |
| Theophylline | <0.1 |

The enzyme inhibitors of the instant invention would normally be administered in the same manner as napaverine, theophylline, etc. The dosage would be approximately of the same order of magnitude as these other agents, but would depend upon the potency of the particular compound to be administered as well as the particular treatment intended.

Thee following examples are given to illustrate the present invention. It is understood that these examples are for illustrative purposes only and are not to be considered as the only manner in which the invention may be embodied.

EXAMPLE I

Compound I ($R_1=R_2=CH_3$, X=Cl, $Y_1=H$, $Y_2=7$-Cl)

A solution of 1,3 - dimethyl - 4 - p - chloroanilinouracil (10 g.) in 200 ml. of thionyl chloride is refluxed for two hours, after which time the thionyl chloride is removed in vacuo, leaving a brown oil. Recrystallization from methylene chloride/hexane yields 7.25 g. of yellow needles, Compound I ($R_1=R_2=CH_3$, X=Cl, $Y_1=H$, $Y_2=7$-Cl), M.P. 149–152° C. (decomp). The entire synthesis is carried out under anhydrous conditions with a nitrogen atmosphere.

*Analysis.*—Calcd. for $C_{12}H_9O_2N_3Cl_2S$: C, 43.55; H, 2.75; N, 12.75; Cl, 21.5; S, 9.7. Found: C, 43.49; H, 2.90; N, 12.71; Cl, 21.98; S, 9.60

Mass spectrum: M/e 329/331

EXAMPLE II

Compound I ($R_1=R_2=CH_3$, X=Cl, $X_1=H$, $Y_2=7$-COCl)

A solution of 1,3-dimethyl-4-p-carboxyanilinouracil (10 g.) and thionyl chloride (100 ml.) in 200 ml. of chloroform is refluxed for four hours, after which time the thionyl chloride and chloroform are removed in vacuo, leaving an oil. Recrystallization from methylene chloride/hexane gives Compound I ($R_1=R_2=CH_3$, X=Cl, $Y_1=H$, $Y_2=7$-COCl), M.P. 170–172° C. The entire synthesis is performed under anhydrous conditions with a nitrogen atmosphere.

EXAMPLE III 1,3-dimethyl-4-anilinouracils

The following 1,3-dimethyl-4-anilinouracils are prepared by the method of Goldner et al., Ann., 694, 142 (1966):

| | | Analysis | |
|---|---|---|---|
| | M.P., °C. | Calcd. | Found |
| Aniline substituent: | | | |
| m-F | 212.5–213.5 | C, 57.85<br>H, 4.86<br>N, 16.86 | 57.84<br>4.72<br>16.79 |
| p-F | 185.5–187 | C, 57.85<br>H, 4.86 | 57.61<br>4.88 |
| m-Cl | 248.5–250 | C, 57.24<br>H, 4.55<br>N, 15.82 | 54.39<br>4.38<br>15.75 |
| p-SO$_2$NH$_2$ | 245–247 | C, 46.45<br>H, 4.55<br>N, 18.06 | 46.59<br>4.63<br>17.5 |
| m-OCH$_3$ | 235–237 | C, 59.76<br>H, 5.79<br>N, 16.08 | 59.98<br>5.80<br>15.86 |
| o-CH$_3$ | 155.5–158 | C, 63.66<br>H, 6.16<br>N, 17.13 | 63.27<br>6.00<br>16.53 |
| p-COOH | ¹ 293–295 | C, 56.72<br>H, 4.76<br>N, 15.27 | 56.25<br>4.78<br>14.67 |
| p-CH$_2$COOH | 249–252 | C, 58.12<br>H, 5.23<br>N, 14.53 | 58.15<br>5.24<br>14.31 |

¹ Decomp.

These anilinouracils are used as substrates in the procedure of Example I, thereby yielding correspondingly substituted Compounds I ($R_1=R_2=CH_3$, X=Cl).

EXAMPLE IV

The following products are prepared by the procedure of Example I, from correspondingly substituted anilinouracils which are synthesized by the method of Goldner et al., ibid.:

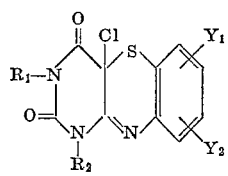

| $R_1$ | $R_2$ | $Y_1$ | $Y_2$ |
|---|---|---|---|
| $CH_3$ | n-$C_4H_9$ | H | H |
| n-$C_6H_{13}$ | n-$C_6H_{13}$ | H | 8-F |
| $C_2H_5$ | $C_6H_5$ | 6-Cl | 8-Cl |
| $CH_2$-$C_6H_5$ | $CH_2CH_2$-$C_6H_5$ | H | 9-Br |
| $CH_3$ | $CH_3$ | H | 7-I |
| $CH_3$ | $CH_3$ | H | 7-O-n-$C_3H_7$ |
| $CH_3$ | $CH_3$ | 7-$OCH_3$ | 8-$OCH_3$ |
| $C_2H_5$ | $CH_3$ | H | 7-$CH_2H_5$ |
| $C_2H_5$ | $CH_3$ | 6-$CO_2CH_3$ | 8-$CO_2CH_3$ |
| $C_2H_5$ | $C_6H_5$ | H | 9-$CO_2C_2H_5$ |
| $C_3H_5$ | $C_6H_5$ | H | 7-$CH_2CO_2C_2H_5$ |
| $C_2H_5$ | $CH_3$ | H | 7-$COCH_3$ |
| $C_2H_5$ | $CH_3$ | H | 7-$CON(CH_3)_2$ |
| $CH_3$ | $CH_3$ | H | 8-$SO_2N(CH_3)_2$ |
| $CH_3$ | $CH_3$ | H | 8-$NO_2$ |
| $CH_3$ | $CH_3$ | 7-CN | 8-CN |
| $CH_3$ | $CH_3$ | H | 9-$CF_3$ |
| $CH_3$ | $CH_3$ | 7,8-O $CH_2CH_2$O— | |

EXAMPLE V

Compound I ($R_1$=$R_2$=$CH_3$, X=Br, $Y_1$=H, $Y_2$=7-Cl)

The procedure of Example I is repeated wherein an equivalent amount of thionyl bromide is used in place of said thionyl chloride, to yield Compound I ($R_1$=$R_2$=$CH_3$, X'=Br, $Y_1$=H, $Y_2$=7-Cl)

EXAMPLE VI

Compound I ($R_1$=$R_2$=$CH_3$, X=$OC_2H_5$, $Y_1$=H, $Y_2$=7-Cl)

To a solution of 7.0 g. of the product of Example I in 50 ml. of methylene chloride is added with stirring a solution of 2.5 ml. of ethanol in 5 ml. of methylene chloride. Compound I ($R_1$=$R_2$=$CH_3$, X=$OC_2H_5$, $Y_1$=H, $Y_2$=7-Cl)

precipitates, and is collected and recrystallized from ethanol; yield 4.9 g., M.P. 187–189° C.

Analysis.—Calcd. from $C_{14}H_{14}O_3N_3ClS$: C, 49.48; H, 4.15; N, 12.37; Cl, 10.43; S, 9.44. Found: C, 49.57; H, 4.17; N, 12.25; Cl, 10.48; S, 9.48.

Mass spectrum: M/e 339/341.

EXAMPLE VII

The procedure of Example VI is repeated wherein 2 g. of sodium bicarbonate is added to the reaction mixture, with similar results obtained thereby.

EXAMPLE VIII

The following compounds are prepared by the procedure of Example VI, using the correspondingly substituted 4a-chloro derivative of Compound I as substrate, and the appropriate reagent HX:

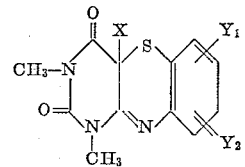

| X | $Y_1$ | $Y_2$ | M.P., ° C. | Yield, percent |
|---|---|---|---|---|
| $OCH_3$ | H | 7-Cl | 173–174 | 70 |
| O-n-$C_3H_7$ | H | 7-Cl | 130–131 | 85 |
| O-i-$C_3H_7$ | H | 7-Cl | 181–182 | 80 |
| $OC_6H_5$ | H | 7-Cl | 228–229 | 65 |
| $OC_6H_4$-o-COOH | H | 7-Cl | 295–297 | 45 |
| $OCH_3$ | H | H | 115–117 | 65 |
| $OC_2H_5$ | H | H | 112–113 | 70 |
| $OC_2H_5$ | H | 7-$CO_2Et$ | 139–140 | 35 |

EXAMPLE IX

The following compounds are prepared by the procedure of Example VI, using the correspondingly substituted 4a-chloro derivative of Compound I as substrate, and the appropriate reagent HX:

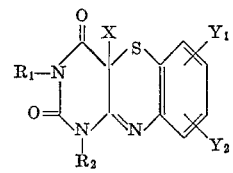

| $R_1$ | $R_2$ | X | $Y_1$ | $Y_2$ |
|---|---|---|---|---|
| $CH_3$ | n-$C_4H_9$ | S $CH_3$ | H | H |
| n-$C_6H_{13}$ | n-$C_6H_{13}$ | S-n-$C_3H_7$ | H | 8-F |
| $C_2H_5$ | $C_6H_5$ | S-n-$C_4H_9$ | 6-Cl | 8-Cl |
| $CH_2$-$C_6H_5$ | $CH_2CH_2$-$C_6H_5$ | $OCH_3$ | H | 9-Br |
| $C_2H_5$ | $CH_3$ | $OC_2H_5$ | H | 7-I |
| $C_2H_5$ | $CH_3$ | O-n-$C_3H_7$ | H | 7-O-n-$C_3H_7$ |
| $C_6H_5$ | $C_6H_5$ | O-i-$C_3H_7$ | 7-$OCH_3$ | 8-$OCH_3$ |
| $C_6H_5$ | $CH_2$-$C_6H_5$ | O-$C_6H_5$ | H | 7-$SC_2H_5$ |
| $CH_3$ | $C_6H_5$ | $OCH_3$ | H | 7-$CO_2H$* |
| $C_6H_5$ | $CH_3$ | $OCH_3$ | 6-$CO_2C_2H_5$ | 8-$CO_2C_2H_5$ |
| $C_6H_5$ | $CH_3$ | $OCH_3$ | H | 7-$CH_2CO_2H$* |
| $C_6H_5$ | $CH_3$ | $OCH_3$ | H | 7-$CH_2CO_2C_2H_5$ |
| $CH_3$ | $CH_3$ | $OC_2H_5$ | H | 7-$COCH_3$ |
| $CH_3$ | $CH_3$ | $OC_2H_5$ | H | 7-$CON(CH_3)_2$ |
| $CH_3$ | $CH_3$ | O-i-$C_3H_7$ | H | 8-$SO_2N(CH_3)_2$ |
| $CH_3$ | $CH_3$ | O-i-$C_3H_7$ | H | 8-$NO_2$ |
| $CH_3$ | $CH_3$ | O-i-$C_3H_7$ | 7-CN | 8-CN |
| $CH_3$ | $CH_3$ | $OC_6H_5$ | H | 9-$CF_3$ |
| $CH_3$ | $CH_3$ | $OC_2H_5$ | 7,8-$OCH_2CH_2$O— | |

*By hydrolysis of substituent formed by reaction.

EXAMPLE X

Compound I ($R_1$=$R_2$=$CH_3$, X=OH, $Y_1$=H, $Y_2$=7-Cl)

The product of Example I (7.0 g.) is dissolved in a mixture of water (100 ml.) and acetone (100 ml.), and solution is heated over a steam bath for 5 minutes, to yield Compound I ($R_1$=$R_2$=$CH_3$, X=OH, $Y_1$=H, $Y_2$=7-Cl). The product is isolated by removing the solvent in vacuo and recrystallizing from methylene chloride/hexane/ethanol; M.P. 156–157° C.

Analysis.—Calcd. for $C_{12}H_{10}O_3N_3ClS$: C, 46.23; H, 3.24; N, 13.48; Cl, 11.37. Found: C, 46.41; H, 3.14; N, 13.30; Cl, 11.49.

EXAMPLE XI

Compound I ($R_1$=$R_2$=$CH_3$, X=N($CH_3$)$_2$, $Y_1$=H, $Y_2$=7-Cl

Ten g. of dimethylamine is condensed into 25 ml. of methylene chloride, and the solution is then added with stirring at 10–15° C. to a solution of 7 g. of the product of Example I in 50 ml. of methylene chloride. The solvent and excess dimethylamine are removed in vacuo and the remaining material is passed through a column of Alumina, activity III, with chloroform as solvent. Recrystallization from methylene chloride/hexane yields Compound I ($R_1=R_2=CH_3$, $X=N(CH_3)_2$, $Y_1=H$, $Y_2=7$-Cl); 6.2 g.; M.P. 180–181° C.

*Analysis.*—Calcd. for $C_{14}H_{15}O_2N_4ClS$: C, 49.63; H, 4.46; N, 16.54; Cl, 10.46; S, 9.6. Found: C, 49.29; H, 4.38; N, 16.44; Cl, 10.74; S, 9.61.

EXAMPLE XII

Compound I ($R_1=R_2=CH_3$, $X=N(CH_3)_2$, $Y_1=H$, $Y_2=7$-Cl)

The procedure of Example XI is repeated, wherein the methylene chloride solution added to the substrate contains 1.5 g. of dimethylamine and 2.5 g. of sodium bicarbonate.

EXAMPLE XIII

Ten-molar equivalent amount of the appropriate amine is added with stirring at room temperature to a solution of 7 g. of the product of Example I in 50 ml. of methylene chloride, yielding the following products:

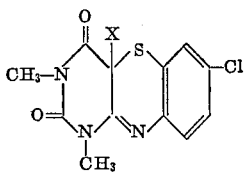

| X | M.P., °C. | Yield, percent |
|---|---|---|
| —N⟩S (thiomorpholine) | 179–180 | 90 |
| —N(CH₃)CH₂CH₂OH | 120–121 | 50 |
| —N⟩N—CH₃ | 165–170 | 70 |
| —N⟩O | 193–197 | 70 |
| —N⟩⟨H⟩OH | 123–127 | 35 |
| —N⟩N—CH₂CH₂OH | 152–153 | 65 |
| —NHCH₂C₆H₅ | 135–136 | 45 |

Isolation of the products is by the procedure of Example XI.

EXAMPLE XIV

The following compounds are prepared by the procedure of Example XIII, using the appropriately substituted 4a-chloro derivative and the appropriate amine:

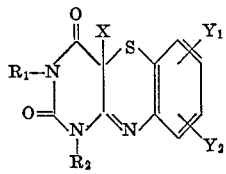

| R₁ | R₂ | X | Y₁ | Y₂ |
|---|---|---|---|---|
| CH₃ | n-C₄H₉ | NH(n-C₄H₉) | H | H |
| n-C₆H₁₃ | n-C₆H₁₃ | NH(n-C₆H₁₃) | H | 8-F |
| C₂H₅ | C₆H₅ | NH(i-C₃H₇) | 6-Cl | 8-Cl |
| CH₂-C₆H₅ | CH₂CH₂-C₆H₅ | NH(i-C₄H₉) | H | 9-Br |
| C₂H₅ | CH₃ | NH(i-C₆H₁₃) | H | 7-I |
| C₂H₅ | CH₃ | NCH₃(n-C₃H₇) | H | 7-O-n-C₃H₇ |
| C₆H₅ | C₆H₅ | N(n-C₄H₉)₂ | 7-OCH₃ | 8-O-CH₃ |
| C₆H₅ | CH₂-C₆H₅ | N(i-C₄H₉)₂ | H | 7-SC₂H₅ |
| C₆H₅ | CH₃ | NHCH₂-C₆H₅ | 6-CO₂C₂H₅ | 8-CO₂C₂H₅ |
| C₆H₅ | CH₃ | NHC₆H₅ | H | 7-CH₂CO₂C₂H₅ |
| CH₃ | CH₃ | N(C₂H₅)₂ | H | 7-COCH₃ |
| CH₃ | CH₃ | N(C₂H₅)₂ | H | 7-CON(CH₃)₂ |
| CH₃ | CH₃ | N(C₂H₅)₂ | H | 8-SO₂N(CH₃)₂ |
| CH₃ | CH₃ | NH₂ | H | 8-NO₂ |
| CH₃ | CH₃ | NH₂ | 7-CN | 8-CN |
| CH₃ | CH₃ | NH₂ | H | 9-CF₃ |
| CH₃ | CH₃ | NH₂ | 7,8-OCH₂CH₂O— | |

In those cases werein $X=NH_2$, anhydrous ammonia is bubbled through the reaction mixture.

EXAMPLE XV

Compound II ($R_1=R_2=CH_3$, $Y_1=H$, $Y_2=7$-Cl)

A solution of N-aminopiperidine (2.0 g., 0.02 mole) in 5 ml. of methylene chloride is added with stirring to a solution of 6.6 g. (0.02 mole) of the product of Example I in 50 ml. of methylene chloride. The resulting green-black crystalline precipitate is collected by filtration, yielding 5.0 g. of the crude radical product. The product is passed through a column of Alumina, activity III, with chloroform, and recrystallized from chloroform/hexane, giving pure Compound II ($R_1=R_2=CH_3$, $Y_1=H$, $Y_2=7$-Cl); M.P. 170–171° C.

*Analysis.*—Calcd. for $C_{12}H_9O_2N_3ClS$: C, 48.89; H, 3.08; Cl, 12.03. Found: C, 49.04; H, 2.87; Cl, 12.08.

Mass spectrum: M/e 294/296.

EXAMPLE XVI

The procedure of Example XV is repeated wherein equivalent amounts of the following reducing agents are used in place of said N-aminopiperidine, with similar results:

phenylhydrazine
methylhydrazine
1,1-dimethylhydrazine
1,2-dimethylhydrazine
N-aminopyrollidine
N-aminohexamethyleneimine
N-aminomorpholine

EXAMPLE XVII

Compound II ($R_1=R_2=CH_3$, $Y_1=H$, $Y_2=7\text{-}CO_2H$)

A solution of ferrous ammonium sulfate (5.7 g., 0.02 mole) in 5 ml. of water is added with stirring to 50 ml. of dioxane containing a molar equivalent amount of Compound I
($R_1=R_2=CH_3$, $X=Cl$, $Y_1=H$, $Y_2=7$-COCl)
Compound II ($R_1=R_2=CH_3$, $Y_1=H$, $Y_2=7\text{-}CO_2H$) precipitates and is collected by filtration.

EXAMPLE XVIII

The procedure of Example XVII is repeated wherein 0.02 mole of the following reducing agents are used in place of said ferrous ammonium sulfate, with similar results:

sodium thiosulfate
sodium sulfite

EXAMPLE XIX

Compound II ($R_1=R_2=CH_3$, $Y_1=H$, $Y_2=7$-COCl)

A suspension of zinc metal (1.3 g., 0.02 mole) in 5 ml. of benzene is added with stirring to 50 ml. of benzene containing an equivalent amount of Compound I ($R_1=R_2=CH_3$, $X=Cl$, $Y_1=H$, $Y_2=7$-COCl). The reaction mixture is filtered, and the filtrate is taken to dryness in vacuo, yielding crude Compound II ($R_1=R_2=CH_3$, $Y_1$=H, $Y_2$=7-COCl), which is recrystallized from trifluoroacetic/acetic acid.

EXAMPLE XX

The following products are prepared by the procedure of Example XVII, using equivalent amounts of appropriately substituted 4a-chloro derivatives of Compound I as substrate:

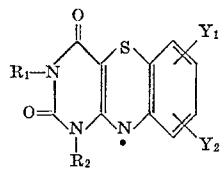

| $R_1$ | $R_2$ | $Y_1$ | $Y_2$ |
|---|---|---|---|
| CH$_3$ | n-C$_4$H$_9$ | H | H |
| n-C$_6$H$_{13}$ | n-C$_6$H$_{13}$ | H | 8-F |
| C$_2$H$_5$ | C$_6$H$_5$ | 6-Cl | 8-Cl |
| CH$_2$-C$_6$H$_5$ | CH$_2$CH$_2$-C$_6$H$_5$ | H | 9-Br |
| CH$_3$ | CH$_3$ | H | 7-I |
| CH$_3$ | CH$_3$ | H | 7-O-n-C$_3$H$_7$ |
| CH$_3$ | CH$_3$ | 7-OCH$_3$ | 8-OCH$_3$ |
| C$_2$H$_5$ | CH$_3$ | H | 7-SC$_2$H$_5$ |
| C$_2$H$_5$ | CH$_3$ | H | 7-CO2C2H5 |
| C$_6$H$_5$ | C$_6$H$_5$ | H | 7-CH$_2$CO$_2$H |
| C$_6$H$_5$ | C$_6$H$_5$ | H | 7-CH$_2$CO$_2$C$_2$H$_5$ |
| C$_6$H$_5$ | CH$_3$ | H | 7-COCH$_3$ |
| C$_6$H$_5$ | CH$_3$ | H | 7-CON(CH$_3$)$_2$ |
| CH$_3$ | CH$_3$ | H | 8-SO$_2$N(CH$_3$)$_2$ |
| CH$_3$ | CH$_3$ | H | 8-NO$_2$ |
| CH$_3$ | CH$_3$ | 7-CN | 8-CN |
| CH$_3$ | CH$_3$ | H | 9-CF$_3$ |
| CH$_3$ | CH$_3$ | 7,8-OCH$_2$CH$_2$O— | |

EXAMPLE XXI

Compound III ($R_1$=$R_2$=CH$_3$, $Y_1$=H, $Y_2$=7-Cl)

To a solution of 7 g. of the product of Example I in 100 ml. of methylene chloride is added with stirring an excess of N-aminopiperidine (8.0 g., 0.08 mole) in 25 ml. of methylene chloride. The reaction solution becomes green and then yellow, at which time a yellow precipitate forms and is collected and recrystallized from DMF/water, yielding Compound III ($R_1$=$R_2$=CH$_3$, $Y_1$=H, $Y_2$=7-Cl), 4.5 g. (73%), M.P. 260–270° C. (decomp.).

Analysis.—Calcd. for C$_{12}$H$_{10}$O$_2$N$_3$ClS: C, 48.73; H, 3.41; N, 14.21; Cl, 11.99; S, 10.84. Found: C, 48.61; H, 3.51; N, 13.53; Cl, 11.92; S, 11.00.

EXAMPLE XXII

The procedure of Example XXI is repeated wherein equivalent amounts of the following reducing agents are used in place of said N-aminopiperidine, with similar results:

hydrazine
phenylhydrazine
methylhydrazine
1,1-dimethylhydrazine
1,2-dimethylhydrazine
N-aminopyrrolidine
N-aminomorpholine
N-aminohexamethyleneimine

EXAMPLE XXIII

Compound III ($R_1$=$R_2$=CH$_3$, $Y_1$=H, $Y_2$=CO$_2$H)

An excess of sodium thiosulfate (12.5 g., 0.08 mole) in 25 ml. of water is added with stirring to 100 ml. of dioxane containing 0.02 mole of the product of Example II. Compound III ($R_1$=$R_2$=CH$_3$, $Y_1$=H, $Y_2$=CO$_2$H) precipitates and is collected by filtration.

EXAMPLE XXIV

The procedure of Example XXIII is repeated wherein equivalent amounts of the following reducing agents are used in place of said sodium thiosulfate, and the reaction is conducted at steam temperature, with similar results:

hydrogen bromide (48% solution)
hydrogen chloride (concentrated solution)

EXAMPLE XXV

The following products are prepared by the procedure of Example XXIII, using equivalent amounts of the appropriately substituted 4a-chloro derivatives of Compound I:

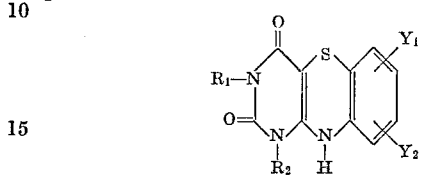

| $R_1$ | $R_2$ | $Y_1$ | $Y_2$ |
|---|---|---|---|
| CH$_3$ | n-C$_4$H$_9$ | H | H |
| n-C$_6$H$_{13}$ | n-C$_6$H$_{13}$ | H | 8-F |
| C$_2$H$_5$ | C$_6$H$_5$ | 6-Cl | 8-Cl |
| CH$_2$-C$_6$H$_5$ | CH$_2$CH$_2$-C$_6$H$_5$ | H | 9-Br |
| C$_2$H$_5$ | CH$_3$ | H | 7-I |
| C$_2$H$_5$ | CH$_3$ | H | 7-O-n-C$_3$H$_7$ |
| C$_6$H$_5$ | C$_6$H$_5$ | 7-OCH$_3$ | 8-OCH$_3$ |
| C$_6$H$_5$ | CH$_2$-C$_6$H$_5$ | H | 7-SC$_2$H$_5$ |
| CH$_3$ | C$_6$H$_5$ | H | 7-CO$_2$C$_2$H$_5$ |
| C$_6$H$_5$ | CH$_3$ | H | 7-CH$_2$CO$_2$H |
| C$_6$H$_5$ | CH$_3$ | H | 7-CH$_2$CO$_2$C$_2$H$_5$ |
| CH$_3$ | CH$_3$ | 6-COCH$_3$ | 8-COCH$_3$ |
| CH$_3$ | CH$_3$ | H | 7-CON(CH$_3$)$_2$ |
| CH$_3$ | CH$_3$ | H | 8-SO$_2$N(CH$_3$)$_2$ |
| CH$_3$ | CH$_3$ | H | 8-NO$_2$ |
| CH$_3$ | CH$_3$ | 7-CN | 8-CN |
| CH$_3$ | CH$_3$ | H | 9-CF$_3$ |
| CH$_3$ | CH$_3$ | 7,8-OCH$_2$CH$_2$O- | |

EXAMPLE XXVI

Compound IV ($R_1$=$R_2$=CH$_3$, $Y_3$=H, $Y_4$=7-Cl)

To 4.13 g. of the product of Example XXI in 200 ml. of ethanol is added slowly 9.24 ml. of 30% hydrogen peroxide; sodium ethoxide is then added until the substrate goes into solution. The solution is heated at reflux temperature for one hour, and the solvent is then removed in vacuo. The residue is triturated with chloroform, filtered, washed with water, and then recrystallized from alkali/acetic acid to yield Compound IV ($R_1$=$R_2$=CH$_3$, $Y_3$=H, $Y_4$=7-Cl), 1.35 g. (30%), M.P. 163–165° C.

Analysis.—Calcd. for C$_{12}$H$_{10}$O$_3$N$_3$ClS: C, 46.23; H, 3.23; N, 13.48; Cl, 11.37; S, 10.29. Found: C, 45.96; H, 3.06; N, 12.97; Cl, 11.19; S, 10.85.

EXAMPLE XXVII

Compound IV ($R_1$=$R_2$=CH$_3$, $Y_3$=$Y_4$=H)

To 4.0 g. of Compound I ($R_1$=$R_2$=CH$_3$, X=Cl, $Y_1$=$Y_2$=H) is added with vigorous stirring a mixture of 100 ml. of ether and 20 ml. of water. Compound IV ($R_1$=$R_2$=CH$_3$, $Y_3$=$Y_4$=H) precipitates and is collected by filtration, M.P. 179° C. (decomp.).

EXAMPLE XXVIII

Compound IV ($R_1$=$R_2$=CH$_3$, $Y_3$=H, $Y_4$=7-CO$_2$H)

The procedure of Example XXVII is repeated wherein an equivalent amount of the product of Example II is used as substrate, yielding Compound IV ($R_1$=$R_2$=CH$_3$, $Y_3$=H, $Y_4$=7-CO$_2$H).

EXAMPLE XXIX

Compound IV ($R_1$=$R_2$=CH$_3$, $Y_3$=H, $Y_4$=7-OCH$_3$)

Six g. of Compound I ($R_1$=$R_2$=CH$_3$, X=N(CH$_3$)$_2$, $Y_1$=H, $Y_2$=7-OCH$_3$) in 160 ml. of glacial acetic acid is heated on a steam bath for 45 minutes. An excess of water is then added and a precipitate forms, which is triturated with warm benzene. The precipitate is then recrystallized from base/acetic acid to yield Compound IV ($R_1$=$R_2$=CH$_3$, $Y_3$=H, $Y_4$=7-OCH$_3$)

EXAMPLE XXX

The following products are prepared by the procedure of Example XXVII, using equivalent amounts of the appropriately substituted 4α-chloro derivatives of Compound I:

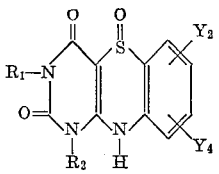

| $R_1$ | $R_2$ | $Y_3$ | $Y_4$ |
|---|---|---|---|
| $CH_3$ | $n-C_4H_9$ | H | 8-F |
| $n-C_6H_{13}$ | $n-C_6H_{13}$ | 6-Cl | 8-Cl |
| $C_2H_5$ | $C_6H_5$ | H | 9-Br |
| $CH_2-C_6H_5$ | $CH_2CH_2-C_6H_5$ | H | 7-I |
| $C_2H_5$ | $CH_3$ | 7-O-n-$C_3H_7$ | 8-O-n-$C_3H_7$ |
| $C_2H_5$ | $CH_3$ | H | 7-$SC_2H_5$ |
| $C_6H_5$ | $C_6H_5$ | H | 7-$CO_2C_2H_5$ |
| $C_6H_5$ | $CH_2-C_6H_5$ | H | 7-$CH_2CO_2H$ |
| $CH_3$ | $C_6H_5$ | H | 7-$CH_2CO_2C_2H_5$ |
| $C_6H_5$ | $CH_3$ | 6-$COCH_3$ | 8-$COCH_3$ |
| $CH_3$ | $CH_3$ | H | 7-$CON(CH_3)_2$ |
| $CH_3$ | $CH_3$ | H | 8-$SO_2N(CH_3)_2$ |
| $CH_3$ | $CH_3$ | H | 8-$NO_2$ |
| $CH_3$ | $CH_3$ | 7-CN | 8-CN |
| $CH_3$ | $CH_3$ | H | 9-$CF_3$ |
| $CH_3$ | $CX_3$ | 7,8-$OCH_2CH_2O-$ | |

EXAMPLE XXXI

Compound V ($R_1=R_2=CH_3$, $Y_1=H$, $Y_2=6-Cl$)

A solution of 1.5 g. of the product of Example XI in 40 ml. of glacial acetic acid is heataed on a steam bath for two hours, after which time the solution is cooled in ice and 25 ml. of water is added to precipitate the product. The product is recrystallized from methylene chloride/hexane/ethanol to yield pure Compound V ($R_1=R_2=CH_3$, $Y_1=H$, $Y_2=6-Cl$), 648 mg., M.P. 187–188° C.

*Analysis.*—Calcd. for $C_{12}H_{10}O_3N_3ClS$: C, 46.23; H, 3.23; N, 13.48; Cl, 11.37; S, 10.29. Found: C, 46.48; H, 3.39; N, 13.42; Cl, 11.27; S, 10.36.

EXAMPLE XXXII

Compound V ($R_1=R_2=CH_3$, $Y_1=Y_2=H$)

Seven g. of Compound I ($R_1=R_2=CH_3$, X=Cl, $Y_1=Y_2=H$) is added to a mixture of 100 ml. of acetone and 100 ml. of water, containing 10 g. of sodium bicarbonate, and the mixture is stirred vigorously on a steam bath for five minutes, yielding Compound V ($R_1=R_2=CH_3$, $Y_1=Y_2=H$)

M.P. 170–172° C.

EXAMPLE XXXIII

Compound V ($R_1=R_2=CH_3$, $Y_1=H$, $Y_2=6-CO_2H$)

The procedure of Example XXXI is repeated wherein the product of Example II is used as substrate in place of said product of Example XI, yielding Compound V ($R_1=R_2=CH_3$, $Y_1=H$, $Y_2=6-CO_2H$).

EXAMPLE XXXIV

Compound V ($R_1=R_2=CH_3$, $Y_1=H$, $Y_2=6-OCH_3$)

The procedure of Example XXXI is repeated wherein Compound IV ($R_1=R_2=CH_3$, $Y_1=H$, $Y_2=7-OCH_3$) is used as substrate in place of said product of Example XI. The product, Compound V ($R_1=R_2=CH_3$, $Y_1=H$, $Y_2=6-OCH_3$) forms as a precipitate.

EXAMPLE XXXV

Compound V ($R_1=R_2=CH_3$, $Y_1=H$, $Y_2=6-Cl$)

Compound I ($R_1=R_2=CH_3$, X=OH, $Y_1=H$, $Y_2=7-Cl$) is heated to 25° C. above its melting point, thereby quantitatively isomerized to Compound V ($R_1=R_2=CH_3$, $Y_1=H$, $Y_2=6-Cl$).

EXAMPLE XXXVI

Compound IV ($R_1=R_2=CH_3$, $Y_3=H$, $Y_4=7-Cl$)

Compound V ($R_1=R_2=CH_3$, $Y_1=H$, $Y_2=6-Cl$)

To 4.13 g. of the product of Example XXI in 200 ml. of ethanol, under reflux, is added slowly 9.24 ml. of 30% hydrogen peroxide; sodium ethoxide is then added until the substrate goes into solution. The solution is refluxed for one hour and then pumped to dryness in vacuo. The residue is triturated with chloroform, leaving Compound IV ($R_1=R_2=CH_3$, $Y_3=H$, $Y_4=7-Cl$). The chloroform solution is then taken to dryness in vacuo, leaving Compound V ($R_1=R_2=CH_3$, $Y_1=H$, $Y_2=6-Cl$), which is recrystallized from methylene chloride/hexane/ethanol.

EXAMPLE XXXVII

The following products are prepared by the procedure of Example XXXII, using equivalent amounts of the appropriately substituted 4a-chloro derivatives of Compound I:

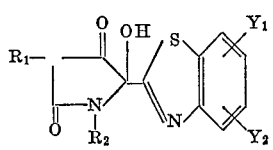

| $R_1$ | $R_2$ | $Y_1$ | $Y_2$ |
|---|---|---|---|
| $CH_3$ | $n-C_4H_9$ | H | 5-F |
| $n-C_6H_{13}$ | $n-C_6H_{13}$ | H | 4-Br |
| $C_2H_5$ | $C_6H_5$ | H | 6-I |
| $CH_2-C_6H_5$ | $CH_2CH_2-C_6H_5$ | H | 6-O-n-$C_3H_7$ |
| $C_2H_5$ | $CH_3$ | H | 6-$SC_2H_5$ |
| $C_2H_5$ | $CH_3$ | H | 6-$CO_2C_2H_5$ |
| $C_6H_5$ | $C_6H_5$ | H | 6-$CH_2CO_2H$ |
| $C_6H_5$ | $CH_2-C_6H_5$ | H | 6-$CH_2CO_2C_2H_5$ |
| $CH_3$ | $C_6H_5$ | 5-$COCH_3$ | 7-$COCH_3$ |
| $C_6H_5$ | $CH_3$ | H | 6-$CON(CH_3)_2$ |
| $CH_3$ | $CH_3$ | H | 5-$SO_2N(CH_3)_2$ |
| $CH_3$ | $CH_3$ | H | 5-$NO_2$ |
| $CH_3$ | $CH_3$ | 5-CN | 6-GN |
| $CH_3$ | $CH_3$ | H | 4-$CF_3$ |
| $CH_3$ | $CH_3$ | 5,6-$OCH_2CH_2O-$ | |

EXAMPLE XXXVIII

Compound VI ($R_1=R_2=CH_3$)

Compound VII ($Y_1=Y_2=H$)

The product of Example XXXII (100 mg.) is heated to a temperature of 275° C. for 15 minutes. Compound VII ($Y_1=Y_2=H$) and Compound VI ($R_1=R_2=CH_3$) distill out as formed. Compound VII is separated from crystalline Compound VI by trituration with hexane.

EXAMPLE XXXIX

Compound VII ($Y_1=H$, $Y_2=6-Cl$)

A mixture of the product of Example XXXV (1 g.) and diphenyl ether (10 g.) is heated to 225° C. for 15 minutes to yield Compound VII ($Y_1=H$, $Y_2=6-Cl$).

EXAMPLE XL

Compound VIII ($R_1=R_2=CH_3$, $Y_1=H$, $Y_2=7-Cl$, Z=$CH_3$)

Compound I ($R_1=R_2=CH_3$, X=$CH_3$, $Y_1=H$, $Y_2=7-Cl$)

1.04 g. of sodium hydride (53% in mineral oil) is added slowly at room temperature with stirring, to a solution of 5.84 g. of the product of Example XXI in 150 ml. of DMF. After the sodium salt has been formed, methyl iodide (8.56 g.) is added quickly with stirring. The solution is stirred for 16 hours at room temperature. The mixture is then filtered, yielding a green solid, Compound VIII ($R_1=R_2=CH_3$, $Y_1=H$, $Y_2=7-Cl$, Z=$CH_3$), 2.37 g., which is recrystallized from ethanol/chloroform, M.P. 216° C. (decomp.).

The filtrate is concentrated to an oil and passed through a column of Alumina Activity III with benzene, yielding Compound I ($R_1=R_2=CH_3$, X=$CH_3$, $Y_1=H$, $Y_2=7$-Cl) which is recrystallized from methylene chloride/hexane, 1.61 g., M.P. 110–113° C.

*Analysis.*—Calcd. for $C_{13}H_{12}O_2N_3ClS$: C, 50.40; H, 3.90; N, 13.57; Cl, 11.45; S, 10.35. Found: C, 49.72; H, 3.66; N, 13.51; Cl, 11.67.

EXAMPLE XLI

Compound VIII ($R_1=R_2=CH_3$, $Y_1=Y_2=H$, $Z=CH_3$)

Compound I ($R_1=R_2=CH_3$, $X=CH_3$, $Y_1=Y_2=H$)

The procedure of Example XL is repeated wherein the substrate is Compound III ($R_1=R_2=CH_3$, $Y_1=Y_2=H$), yielding Compound VIII ($R_1=R_2=CH_3$, $Y_1=Y_2=H$, $Z=CH_3$), M.P. 203–204° C., and Compound I $$(R_1=R_2=CH_3, X=CH_3, Y_1=Y_2=H)$$

M.P. 109° C.

EXAMPLE XLII

The following products are prepared by the procedure of Example XL using equivalent amounts, respectively, of correspondingly substituted Compounds III and alkyl iodide:

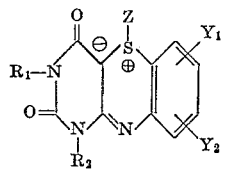 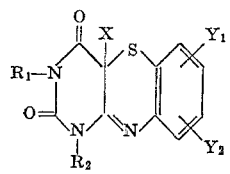

| $R_1$ | $R_2$ | XZ | $Y_1$ | $Y_2$ |
|---|---|---|---|---|
| $CH_3$ | $n$-$C_4H_9$ | $CH_3$ | H | 8-F |
| $n$-$C_6H_3$ | $n$-$C_6H_{13}$ | $C_2H_5$ | H | 9-Br |
| $C_2H_5$ | $C_6H_5$ | $n$-$C_3H_7$ | H | 7-I |
| $CH_2$-$C_6H_5$ | $CH_2CH_2$-$C_6H_5$ | $n$-$C_4H_9$ | H | 7-O-$n$-$C_3H_7$ |
| $C_6H_5$ | $C_6H_5$ | $n$-$C_5H_{11}$ | H | 7-$SC_2H_5$ |
| $C_6H_5$ | $CH_3$ | $CH_3$ | H | 7-$CO_2H$ |
| $CH_3$ | $CH_3$ | $CH_3$ | H | 7-$CO_2C_2H_5$ |
| $CH_3$ | $CH_3$ | $CH_3$ | H | 7-$CH_2CO_2H$ |
| $CH_3$ | $CH_3$ | $CH_3$ | 6-$COCH_3$ | 8-$COCH_3$ |
| $CH_3$ | $CH_3$ | $CH_3$ | H | 7-$CON(CH_3)_2$ |
| $CH_3$ | $CH_3$ | $CH_3$ | H | 8-$SO_2N(CH_3)_2$ |
| $CH_3$ | $CH_3$ | $CH_3$ | H | 8-$NO_2$ |
| $CH_3$ | $CH_3$ | $CH_3$ | 7-CN | 8-CN |
| $CH_3$ | $CH_3$ | $CH_3$ | H | 9-$CF_3$ |
| $CH_3$ | $CH_3$ | $CH_3$ | 7,8-$OCH_2CH_2O$— | |

EXAMPLE XLIII

Compound I ($R_1=R_2=CH_3$, $X=CH_3$, $Y_1=H$, $Y_2=7$-Cl)

One g. of Compound VIII ($R_1=R_2=CH_3$, $Y_1=H$, $Y_2=7$-Cl, $Z=CH_3$) is heated to 220° C. for 5 minutes, giving Compound I ($R_1=R_2=CH_3$, $X=CH_3$, $Y_1=H$, $Y_2=7$-Cl) in a quantitative yield. The product is distilled in vacuo for purification.

EXAMPLE XLIV

To a solution of 7 g. of the product of Example I in 100 ml. of methylene chloride is added with stirring an excess of N-aminopiperidine (8.0 g., 0.08 mole) in 25 ml. of methylene chloride. Compound III ($R_1=R_2=CH_3$, $Y_1=H$, $Y_2=7$-Cl) forms as a precipitate, is collected, and is added to 150 ml. of dry DMF. A two-molar equivalent amount of sodium hydride (53% in mineral oil) is added slowly with stirring, followed by the addition of a two-molar equivalent of methyl iodide. The reaction mixture is stirred for 16 hours. Compound VIII ($R_1=R_2=CH_3$, $Y_1=H$, $Y_2=7$-Cl, $Z=CH_3$) is collected by filtration, and Compound I ($R_1=R_2=CH_3$, $X=CH_3$, $Y_1=H$, $Y_2=7$-Cl) is recovered from the filtrate.

EXAMPLE XLV

To a solution of 7.0 g. of the product of Example I in 50 ml. of methylene chloride is added with stirring a solution of 2.5 ml. of ethanol in 5 ml. of methylene chloride. Compound I ($R_1=R_2=CH_3$, $X=OC_2H_5$, $Y_1=H$, $Y_2=7$-Cl) precipitates and is collected. The product is added to 150 ml. of glacial acetic and is refluxed for 2 hours, yielding Compound V ($R_1=R_2=CH_3$, $Y_1=H$, $Y_2=6$-Cl).

EXAMPLE XLVI

To a solution of 7 g. of the product of Example I in 100 ml. of methylene chloride is added with stirring an excess of N-aminopiperidine (8.0 g., 0.08 mole) in 25 ml. of methylene chloride. Compound III ($R_1=R_2=CH_3$, $Y_1=H$, $Y_2=7$-Cl) forms as a precipitate, is collected, and is added in 200 ml. of ethanol. To this mixture is added, under refluxing conditions, an excess of hydrogen peroxide (10 ml., 30% solution). Sufficient sodium ethoxide is added to dissolve the substrate, and the solution is refluxed for one hour and then taken to dryness in vacuo. The residue is triturated with chloroform, leaving Compound IV ($R_1=R_2=CH_3$, $Y_3=H$, $Y_4=7$-Cl), which is treated with refluxing glacial acetic acid for 20 minutes. The product, Compound V ($R_1=R_2=CH_3$, $Y_1=H$, $Y_2=6$-Cl), is precipitated by the addition of an excess of water.

What is claimed is:

1. A compound of the formula

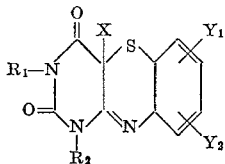

wherein $R_1$ and $R_2$ are each selected from the group consisting of normal alkyl containing up to 6 carbon atoms, phenyl, benzyl and β-phenylethyl; X is selected from the group consisting of hydroxy, alkoxy of 1–4 carbons, phenoxy, o-carboxyphenoxy, alkyl (1–4 carbons) sulfide, amino, alkylamino of up to 6 carbons, dialkylamino of up to 6 carbons, phenylamino, benzylamino, thiamorpholino, N'-methylpiperazino, morpholino, 4-hydroxypiperidino, N'-(β-hydroxyethyl)-piperazino, N-methyl-N-(β-hydroxyethyl)-amino, normal alkyl containing up to 5 carbon atoms, chloro and bromo; $Y_1$ and $Y_2$ are each selected from the group consisting of hydrogen, halogen, alkoxy of 1–4 carbons, alkyl (1–4 carbons) sulfide, carboxy, carbomethoxy, carbethoxy, carboxymethyl, carbomethoxymethyl, carbethoxymethyl, chloroformyl, acetyl, dimethylcarboxamido, dimethylsulfonamido, nitrile, nitro, trifluoromethyl, and, with $Y_1$ and $Y_2$ on adjacent carbon atoms, methylenedioxy and ethylenedioxy, provided that when X is chloro or bromo, neither $Y_1$ nor $Y_2$ can be carboxy or carboxymethyl.

2. A compound of claim 1 wherein $R_1$ and $R_2$ are each selected from the group consisting of normal alkyl containing up to 6 carbon atoms, phenyl, benzyl and β-phenylethyl; X is chloro; and $Y_1$ and $Y_2$ are each selected from the group consisting of hydrogen, halogen, 1–4 carbon alkoxy, 1–4 carbon alkyl sulfide, carbomethoxy, carbethoxy, carbomethoxymethyl, carbethoxymethyl, chloroformyl, acetyl, dimethylcarboxamido, dimethylsulfonamido, nitrile, nitro, trifluoromethyl, and, with $Y_1$ and $Y_2$ on adjacent carbon atoms, methylenedioxy and ethylenedioxy.

3. A compound of claim 1 wherein $R_1$ and $R_2$ are methyl, X is alkoxy of 1–4 carbons, and $Y_1$ and $Y_2$ are each selected from the group consisting of hydrogen, halogen, 1–4 carbon alkoxy, 1–4 carbon alkyl sulfide, carboxy, carbomethoxy, carbethoxy, carboxymethyl, carbomethoxymethyl, carbethoxymethyl, chloroformyl, acetyl, dimethylcarboxamido, dimethylsulfonamido, nitrile, nitro, trifluoromethyl, and with $Y_1$ and $Y_2$ on adjacent carbon atoms, methylenedioxy and ethylenedioxy.

4. A compound of claim 1 wherein $R_1$ and $R_2$ are methyl, X is amino or substituted amino, wherein the substituent contains up to 8 carbons, and $Y_1$ and $Y_2$ are each selected from the group consisting of hydrogen, halogen, 1–4 carbon alkoxy, 1–4 carbon alkyl sulfide, carboxy, carbomethoxy, carbethoxy, carboxymethyl, carbomethoxymethyl, carbethoxymethyl, chloroformyl, acetyl, dimethylcarboxamido, dimethylsulfonamido, nitrile, nitro, trifluoromethyl, and, with $Y_1$ and $Y_2$ on adjacent carbon atoms, methylenedioxy and ethylenedioxy.

5. A compound of claim 1 wherein $R_1$ and $R_2$ are methyl, X is normal alkyl containing up to 5 carbon atoms, and $Y_1$ and $Y_2$ are each selected from the group consisting of hydrogen, halogen, 1–4 carbon alkoxy, 1–4 carbon alkyl sulfide, carboxy, carbomethoxy, carbethoxy, carboxymethyl, carbomethoxymethyl, carbethoxymethyl, chloroformyl, acetyl, dimethylcarboxamido, dimethylsulfonamido, nitrile, nitro, trifluoromethyl, and, with $Y_1$ and $Y_2$ on adjacent carbon atoms, methylenedioxy and ethylenedioxy.

6. The compound of claim 1 wherein $R_1$ and $R_2$ are methyl, X is chloro, $Y_1$ is hydrogen and $Y_2$ in 7-chloro.

7. The compound of claim 1 wherein $R_1$ and $R_2$ are methyl, X is ethoxy, $Y_1$ is hydrogen and $Y_2$ is 7-chloro.

8. The compound of claim 1 wherein $R_1$ and $R_2$ are methyl, X is ethoxy, $Y_1$ is hydrogen and $Y_2$ is 7-carbethoxy.

9. The compound of claim 1 wherein $R_1$ and $R_2$ are methyl, X is methyl-$\beta$-hydroxyethylamino, $Y_1$ is hydrogen and $Y_2$ is 7-chloro.

10. The compound of claim 1 wherein $R_1$ and $R_2$ are methyl, X is 4-hydroxypiperidine, $Y_1$ is hydrogen and $Y_2$ is 7-chloro.

11. The compound of claim 1 wherein $R_1$ and $R_2$ are methyl, X is morpholino, $Y_1$ is hydrogen and $Y_2$ is 7-chloro.

12. The compound of claim 1 wherein $R_1$ and $R_2$ are methyl, X is o-carboxyphenoxy, $Y_1$ is hydrogen and $Y_2$ is 7-chloro.

13. The compound of claim 1 wherein $R_1$ and $R_2$ are methyl, X is 4-methylpiperazine, $Y_1$ is hydrogen and $Y_2$ is 7-chloro.

14. The compound of claim 1 wherein $R_1$ and $R_2$ are methyl, X is methyl, $Y_1$ is hydrogen and $Y_2$ is 7-chloro.

15. A compound of the fromula

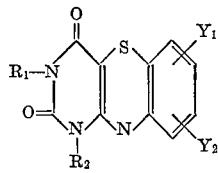

wherein $R_1$ and $R_2$ are each selected from the group consisting of normal alkyl containing up to 6 carbon atoms, phenyl, benzyl, and $\beta$-phenylethyl; and $Y_1$ and $Y_2$ are each selected from the group consisting of hydrogen, halogen, 1–4 carbon alkoxy, 1–4 carbon alkyl sulfide, carboxy, carbomethoxy, carbethoxy, carboxymethyl, carbomethoxymethyl, carbethoxymethyl, chloroformyl, acetyl, dimethylcarboxamido, dimethylsulfonamido, nitrile, nitro, trifluoromethyl, and, with $Y_1$ and $Y_2$ on adjacent carbon atoms, methylenedioxy and ethylenedioxy.

16. A compound of claim 15 wherein $R_1$ and $R_2$ are methyl, and $Y_1$ and $Y_2$ are each selected from the group consisting of hydrogen, halogen, 1–4 carbon alkoxy, 1–4 carbon alkyl sulfide, carboxy, carbomethoxy, carbethoxy, carboxymethyl, carbomethoxymethyl, carbethoxymethyl, chloroformyl, acetyl, dimethylcarboxamido, dimethylsulfonamido, nitrile, nitro, trifluoromethyl, and, with $Y_1$ and $Y_2$ on adjacent carbon atoms, methylenedioxy and ethylenedioxy.

17. The compound of claim 15 wherein $R_1$ and $R_2$ are methyl, $Y_1$ is hydrogen, and $Y_2$ is 7-chloro.

18. The compound of claim 15 wherein $R_1$ and $R_2$ are methyl, $Y_1$ is hydrogen, and $Y_2$ is 7-carboxy.

19. A compound of the formula

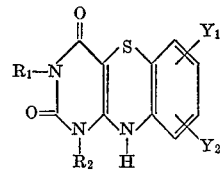

wherein $R_1$ and $R_2$ are each selected from the group consisting of normal alkyl containing up to 6 carbon atoms, phenyl, benzyl, and $\beta$-phenylethyl; and $Y_1$ and $Y_2$ are each selected from the group consisting of hydrogen, halogen, 1–4 carbon alkoxy, 1–4 carbon alkyl sulfide, carboxy, carbomethoxy, carbethoxy, carboxymethyl, carbomethoxymethyl, carbethoxymethyl, chloroformyl, acetyl, dimethylcarboxamido, dimethylsulfonamido, nitrile, nitro, trifluoromethyl, and, with $Y_1$ and $Y_2$ on adjacent carbon atoms, methylenedioxy and ethylenedioxy.

20. A compound of claim 19 wherein $R_1$ and $R_2$ are methyl, and $Y_1$ and $Y_2$ are each selected from the group consisting of hydrogen, halogen, 1–4 carbon alkoxy, 1–4 carbon alkyl sulfide, carboxy, carbomethoxy, carbethoxy, carboxymethyl, carbomethoxymethyl, carbethoxymethyl, chloroformyl, acetyl, dimethylcarboxamido, dimethylsulfonamido, nitrile, nitro, trifluoromethyl, and, with $Y_1$ and $Y_2$ on adjacent carbon atoms, methylenedioxy and ethylenedioxy.

21. The compound of claim 19 wherein $R_1$ and $R_2$ are methyl, $Y_1$ is hydrogen, and $Y_2$ is 7-chloro.

22. The compound of claim 19 wherein $R_1$ and $R_2$ are methyl, $Y_1$ is hydrogen, and $Y_2$ is 7-carboxy.

23. A compound of the formula

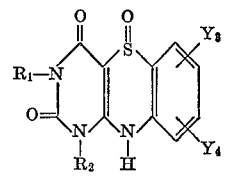

wherein $R_1$ and $R_2$ are each selected from the group consisting of normal alkyl containing up to 6 carbon atoms, phenyl, benzyl, and $\beta$-phenylethyl; and $Y_3$ and $Y_4$ are each selected from the group consisting of hydrogen, halogen, 1–4 carbon alkoxy, 1–4 carbon alkyl sulfide, carboxy, carbomethoxy, carbethoxy, carboxymethyl, carbomethoxymethyl, carbethoxymethyl, acetyl, dimethylcarboxamido, dimethylsulfonamido, nitrile, nitro, trifluoromethyl, and, with $Y_3$ and $Y_4$ on adjacent carbon atoms, methylenedioxy and ethylenedioxy.

24. A compound of claim 23 wherein $R_1$ and $R_2$ are methyl, and $Y_3$ and $Y_4$ are each selected from the group consisting of hydrogen, halogen, 1–4 carbon alkoxy, 1–4 carbon alkyl sulfide, carboxy, carbomethoxy, carbethoxy, carboxymethyl, carbomethoxymethyl, carbethoxymethyl, acetyl, dimethylcarboxamido, dimethylsulfonamido, nitrile, nitro, trifluoromethyl, and, with $Y_3$ and $Y_4$ on adjacent carbon atoms, methylenedioxy and ethylenedioxy.

25. The compound of claim 23 wherein $R_1$ and $R_2$ are methyl, $Y_3$ is hydrogen, and $Y_4$ is 7-chloro.

26. The compound of claim 23 wherein $R_1$ and $R_2$ are methyl, $Y_3$ is hydrogen, and $Y_4$ is 7-carboxy.

27. A compound of the formula

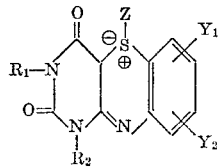

wherein $R_1$ and $R_2$ are each selected from the group consisting of normal alkyl containing up to 6 carbon atoms, phenyl, benzyl, and β-phenylethyl; $Y_1$ and $Y_2$ are each selected from the group consisting of hydrogen, halogen, 1–4 carbon alkoxy, 1–4 carbon alkyl sulfide, carboxy, carbomethoxy, carbethoxy, carboxymethyl, carbomethoxymethyl, carbethoxymethyl, chloroformyl, acetyl, dimethylcarboxamido, dimethylsulfonamido, nitrile, nitro, trifluoromethyl, and, with $Y_1$ and $Y_2$ on adjacent carbon atoms, methylenedioxy and ethylenedioxy; and Z is normal alkyl containing up to 5 carbon atoms.

28. A compound of claim 27 wherein $R_1$ and $R_2$ are methyl; $Y_1$ and $Y_2$ are each selected from the group consisting of hydrogen, halogen, 1–4 carbon alkoxy, 1–4 carbon alkyl sulfide, carboxy, carbomethoxy, carbethoxy, carboxymethyl, carbomethoxymethyl, carbethoxymethyl, chloroformyl, acetyl, dimethylcarboxamido, dimethylsulfonamido, nitrile, nitro, trifluoromethyl, and, with $Y_1$ and $Y_2$ on adjacent carbon atoms, methylenedioxy and ethylenedioxy; and Z is methyl.

29. The compound of claim 27 wherein $R_1$ and $R_2$ are methyl, $Y_1$ is hydrogen, $Y_2$ is 7-chloro, and Z is methyl.

30. The compound of claim 15 wherein $R_1$ and $R_2$ are methyl, $Y_1$ is hydrogen, and $Y_2$ is 7-chloroformyl.

No references cited.

HENRY R. JILES, Primary Examiner

HARRY I. MOATZ, Assistant Examiner

U.S. Cl. X.R.

260—304, 309.5, 256.4, 260, 256.5; 424—246, 244

UNITED STATES PATENT OFFICE
CERTIFICATE OF CORRECTION

Patent No. 3,483,198           Dated December 9, 1969

Inventor(s) Irving M. Goldman

It is certified that error appears in the above-identified patent and that said Letters Patent are hereby corrected as shown below:

Column 4, in the formula, the left hand portion of the formula now reading

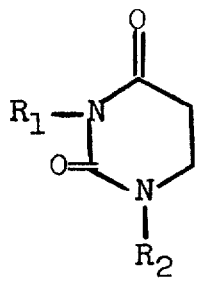     should read     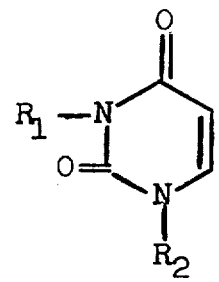

Column 8, in the formula, the middle portion of the formula now reading

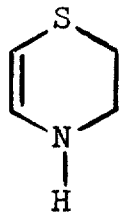     should read     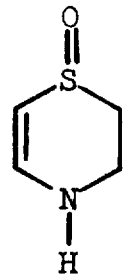

SIGNED AND SEALED
JUL 14 1970

(SEAL)
Attest:

Edward M. Fletcher, Jr.
Attesting Officer

WILLIAM E. SCHUYLER, JR.
Commissioner of Patents